US012405092B2

(12) United States Patent
Stark et al.

(10) Patent No.: US 12,405,092 B2
(45) Date of Patent: Sep. 2, 2025

(54) HORN ANTENNA AND METHOD FOR RECONSTRUCTING A HORN ANTENNA

(71) Applicant: Diehl Defence GmbH & Co. KG, Ueberlingen (DE)

(72) Inventors: Robert Stark, Bad Windsheim (DE); Martin Hertel, Lauf (DE)

(73) Assignee: Diehl Defence GmbH & Co. KG, Ueberlingen (DE)

( * ) Notice: Subject to any disclaimer, the term of this patent is extended or adjusted under 35 U.S.C. 154(b) by 967 days.

(21) Appl. No.: 17/523,092

(22) Filed: Nov. 10, 2021

(65) Prior Publication Data

US 2022/0146236 A1 May 12, 2022

(30) Foreign Application Priority Data

Nov. 10, 2020 (DE) ......................... 102020006892.8

(51) Int. Cl.
*F41H 13/00* (2006.01)
*H05B 6/68* (2006.01)
(Continued)

(52) U.S. Cl.
CPC ........... *F41H 13/0068* (2013.01); *H05B 6/68* (2013.01); *H05B 6/707* (2013.01); *H05B 6/72* (2013.01); *H05B 2206/044* (2013.01)

(58) Field of Classification Search
CPC ........ H05B 6/688; H05B 6/705; H05B 6/707; H01Q 13/02; H01Q 1/02; H01Q 17/00; H01Q 19/062; H01Q 19/17; H01Q 19/19
(Continued)

(56) References Cited

U.S. PATENT DOCUMENTS 4,058,813 A * 11/1977 Risko ................. H01Q 13/0283 343/786
5,319,322 A 6/1994 O'Loughlin
(Continued)

FOREIGN PATENT DOCUMENTS

CN 102569971 A 7/2012
DE 102018004568 A1 12/2019

OTHER PUBLICATIONS

Chen, CN 102569971 (Year: 2014).*

*Primary Examiner* — Vy T Nguyen
(74) *Attorney, Agent, or Firm* — Laurence A. Greenberg; Werner H. Stemer; Ralph E. Locher

(57) ABSTRACT

A horn antenna for emitting an electromagnetic HPEM microwave pulse along a central axis contains a microwave generator for the pulse having a waveguide along the central axis with a generator opening for the pulse, and a horn structure for shaping the pulse with an input opening and an emission opening for the pulse. The generator contains at least one HPEM source for the pulse. Each HPEM source contains at least two antennas for pulse components, disposed in succession in parallel with the central axis. The pulse is formed as a sum of the pulse components. A method for reconstructing a horn antenna to form the horn antenna with increased power, includes constructively increasing a number of antennas toward a respective HPEM source and orienting remaining antennas in a row relative to the first antenna, increasing the waveguide length, and keeping other dimensions of the horn antenna unchanged.

15 Claims, 2 Drawing Sheets

(51) Int. Cl.
*H05B 6/70* (2006.01)
*H05B 6/72* (2006.01)

(58) Field of Classification Search
USPC .......... 219/702; 343/786, 703, 776; 330/4.7; 331/81; 250/305
See application file for complete search history.

(56) References Cited

U.S. PATENT DOCUMENTS

| | | | | |
|---|---|---|---|---|
| 6,246,039 | B1 * | 6/2001 | Omori | H05B 6/707 219/746 |
| 7,518,092 | B2 * | 4/2009 | Purta | B01J 19/126 422/21 |
| 2019/0376769 | A1 | 12/2019 | Stark et al. | |

* cited by examiner

HORN ANTENNA AND METHOD FOR RECONSTRUCTING A HORN ANTENNA

CROSS-REFERENCE TO RELATED APPLICATION

This application claims the priority, under 35 U.S.C. § 119, of German Patent Application DE 10 2020 006 892.8, filed Nov. 10, 2020; the prior application is herewith incorporated by reference in its entirety.

FIELD AND BACKGROUND OF THE INVENTION

The invention relates to a horn antenna and a method for reconstructing an existing horn antenna to form a horn antenna with increased power.

A horn antenna is known in practice: In such a horn antenna or horn structure there is a feed point or an antenna rod, an antenna DS (damped sinusoidal) resonator or an antenna feed. The latter is situated in a waveguide which serves to direct or focus, in the direction of the horn antenna (of the horn), the electromagnetic energy emitted by the antenna rod. As a rule, the waveguide is a metallic body in the form of a cuboid which has an opening on one side. That opening is connected directly to the horn and guides the emitted electromagnetic energy into the horn antenna or horn structure, which then on the basis of its geometry (length, angle, aperture, etc.) directs and focuses the electromagnetic energy in the direction of the antenna aperture and hence, e.g., of a target. The geometry of the waveguide itself orients itself according to the length of the rod antenna or the feed antenna, and the emitted wavelength or the wavelength range. By increasing the power fed through the antenna feed (power supply to the antenna)—within the scope of a reconstruction of an existing horn antenna—the emitted power of the waveguide and hence of the overall system is then also increased. The maximum feedable or emitted power and effective range of the system is then determined by the physical limit of the feed antenna, of the waveguide and of the horn antenna/horn structure/horn geometry.

SUMMARY OF THE INVENTION

It is accordingly an object of the invention to provide a horn antenna and a method for reconstructing a horn antenna, which overcome the hereinafore-mentioned disadvantages of the heretofore-known antennas and methods of this general type and which propose improvements in relation to horn antennas.

With the foregoing and other objects in view there is provided, in accordance with the invention, a horn antenna for emitting an electromagnetic HPEM microwave pulse along a central axis, the horn antenna comprising a microwave generator for generating the pulse, the generator having a waveguide with a generator opening for outputting the pulse, the waveguide extending along the central axis, a horn structure for shaping the pulse having an input opening serving to radiate the pulse and being connected to the generator opening and an emission opening for emitting the shaped pulse, the generator containing at least one HPEM source for generating the pulse, each of the HPEM sources containing at least two antennas disposed in succession in parallel with the central axis and each serving to emit a pulse component, and the pulse being formed as a sum of the pulse components.

Preferred or advantageous embodiments of the invention and of other invention categories become apparent from the further claims, from the following description and from the appended figures.

The horn antenna serves to emit an electromagnetic HPEM (high-power electromagnetic) microwave pulse along a central axis of the horn antenna. The horn antenna contains a microwave generator for generating the pulse. The generator contains a waveguide. The waveguide has a generator opening for emitting the pulse generated within the waveguide. The waveguide extends along the central axis.

The horn antenna contains a horn structure. This serves to shape the pulse that was generated in the waveguide and passed to the horn structure through the generator opening. The horn structure has an input opening. The input opening is connected—in particular directly connected—to the generator opening and serves to radiate in or receive the pulse. The horn structure has an emission opening, which serves to emit the shaped pulse.

The generator contains at least one HPEM source for generating the pulse. One or more of the sources may be involved in the generation of a respective pulse. Each of the HPEM sources contains at least two antennas. The antennas of each of the sources are disposed in a row or in series, in particular along a straight line, parallel to the central axis. In this case, each source forms its own row. Each of the antennas serves to respectively generate or emit a pulse component. Pulse components respectively generated or emitted at the same time superpose to form the pulse in such a way that the pulse at a certain time is formed as a sum of the respective simultaneously prevalent pulse components at that time.

"Simultaneous" should be understood as a simple phrase for the fact that an actual superposition may occur; phase differences, times of flight, waveguide effects, etc., are included therein.

According to the invention, the use of serial antenna/resonator configurations/groupings in a waveguide arises. This yields an increase in the power and the effective range of the overall system (horn antenna) while maintaining the horn antenna geometry/structure. By way of example, the use of four feed antennas (antennas) only requires a small adjustment of the waveguide length by approximately 30 cm in relation to a single feed antenna. In the process, the horn geometry remains unchanged. By using, e.g., four feed antennas, it is possible to input couple four times the power into the waveguide or the horn structure. As a result, the emitted field strength and hence the obtainable range can be virtually doubled (ideal case).

In a preferred embodiment, at least one of the antennas is an antenna rod and/or an antenna DS resonator and/or a feed and/or a dipole and/or a group. Such antennas are particularly well suited for the invention.

In a preferred embodiment, the waveguide is a metallic body. Such a waveguide is particularly well suited for the invention.

In a preferred embodiment, the waveguide has a cuboid form. The waveguide is preferably opened on one side, in particular only opened on this one side. Such waveguides are particularly effective for the invention.

In a preferred embodiment, the horn structure and/or the waveguide has—in relation to the central axis—a polygonal cross section. Such shapes are particularly advantageous for the invention.

In a preferred embodiment, at least two of the antennas are disposed together in one plane. In this way, simultaneously emitted pulse components of the antennas can be combined particularly effectively to form a summed pulse.

In a preferred embodiment, adjacent antennas of an HPEM source have the same spacings from one another for at least one of these HPEM sources. Suitable driving of the individual antennas in order to achieve an effective addition of the pulse components to form a (summed) pulse is consequently possible in particularly easy fashion.

In a preferred embodiment, the horn antenna contains a control unit. The latter is configured—for example by fixed wiring or programming—to drive an individual antenna of the antennas in order to generate the pulse. The control unit is further configured, as an alternative thereto, to drive at least two antennas of the antennas with respect to the activation and the phase angle of their respective pulse component in such a way that the pulse components of these antennas superpose to form the pulse so that its emission direction is directed parallel to the central axis toward the generator opening. In this case, the antennas can belong to one or more HPEM sources. In particular, all antennas are driven together in this case in order to generate the pulse from all pulse components. As a result, a particularly powerful pulse can be generated by the horn antenna. Precise driving of the antennas with respect to waveform, pulse duration, phase angle, etc., is ascertained or defined, in particular, by measurement, simulation, in empirical fashion, etc., and depends in particular on the respective conditions of the waveguide, the antennas, in particular the geometric relationships of all involved components, on a case-by-case basis.

In a preferred variant of this embodiment the control unit is configured to drive the antennas or antenna feeds individually or in time-synchronous fashion or with a time offset in relation to individual or a plurality of other antennas. In particular, driving is implemented up to their respective maximum power. Certain desired properties can be imparted to the pulse by way of appropriate driving. In this case, too, precise driving, etc., is ascertained like above.

In a preferred variant of this embodiment the control unit is configured to drive individual antennas in a burst mode with time lags. In particular, effective burst pulses can be generated by the horn antenna as a result. In particular, correspondingly “long” time lags are chosen in this case in order to in fact generate individual bursts.

In a preferred variant of this embodiment, the control unit is configured to drive at least two of the antennas in such a way that the wavefronts of the pulse components superpose constructively in the, or to form the, wavefront of the pulse, in the direction of the central axis toward the emission opening. Expressed differently, the individual antennas are driven “serially in phase” in order to generate a pulse with a wavefront that has the maximum possible energy. In this case, too, precise driving, etc., is ascertained like above.

With the objects of the invention in view, there is concomitantly provided a method for reconstructing a horn antenna to form a horn antenna according to the invention with increased power, the method comprising, proceeding from at least one respective first antenna:

- the number of antennas is constructively increased toward a respective HPEM source and the remaining antennas of the HPEM source are disposed in a row with respect to the first antenna,
- the length of the waveguide is increased, and
- the other dimensions of the horn antenna remain unchanged.

The method serves to reconstruct, i.e., alter or adapt, an existing structure of an (existing or already constructed) non-inventive horn antenna to form an (altered, new) horn antenna according to the invention with increased power.

The starting point of the method is at least one respective first antenna, which is present in an existing non-inventive horn antenna. In particular, only this single antenna is present there.

For a respective first antenna, the number of antennas is constructively increased to form a respective HPEM source, that is to say, e.g., from one antenna to two, three or four antennas. The remaining antennas of the HPEM source, added to the first, are then disposed in a row with respect to the first antenna. The length of the waveguide is increased, with the remaining dimensions of the horn antenna remaining unchanged.

In particular, a respective own HPEM source or antenna group is created for each first antenna. As an alternative or in addition thereto, a plurality of first antennas, in particular, are combined in an HPEM source and are complemented by at least one further antenna.

As a result, an existing horn antenna can be reconstructed particularly easily to form a more powerful horn antenna by the simple addition of further antennas and a lengthening of the waveguide.

The method and at least some of the embodiments thereof and the respective advantages already have been explained analogously in connection with the horn antenna according to the invention.

The invention is based on the following findings, observations or considerations and also includes the following embodiments. The embodiments are in this case also referred to as “the invention,” partly for the purposes of simplification. The embodiments may in this case also contain parts or combinations of the aforementioned embodiments or correspond to them and/or possibly also include embodiments which have not yet been mentioned.

The invention is based on the concept of facilitating a gain in power and increase in range of HPEM horn antennas, preferably while maintaining the antenna size, horn structure and horn size. A further concept also lies in increasing the power density and integration density of HPEM horn antennas.

In this case, the invention is based on the following thoughts: An increase in the power and range of a horn antenna can be achieved by virtue of accordingly increasing the horn structure and the aperture of the horn. This leads to better focusing of the emitted energy on the central axis of the system. In many cases, particularly for HPEM applications, it is desirable, however, not to further increase the size of the antenna system or the horn antenna, but rather tend to keep this smaller. An increase in the power and the range of the horn antenna for a given horn geometry or dimensions can then be realized by way of the increase in the power supplied into the horn, for example.

The invention is based on the discovery that—as described above—there is only a single feed point or antenna rod, etc., in a horn antenna known from practice and the supplied power can be increased for the power gain.

The invention is based on the thought that a further increase in the effective range and power of HPEM systems is facilitated by coupling the HPEM array principle with an HPEM horn antenna, by integrating a plurality of HPEM DS resonators (HPEM DS array) or other antenna structures (rod antenna, dipole antenna) in one or more HPEM horn antenna structure(s). By way of parallel, synchronous simultaneous operation and driving of the individual DS resonators, antenna rods or antenna dipoles and superposition of the synchronously emitted wavefronts, it is possible to significantly increase the power and effective range of the system.

However, parallel integration (next to one another or transverse to the central axis) of a plurality (n>=2) of resonators according to the array principle is disadvantageous in that the waveguide at the interface (feed point) to the horn antenna has to be significantly altered in terms of its geometry and has to be enlarged. In particular, the waveguide becomes significantly wider with increasing number of resonators integrated in parallel. The enlargement of the waveguide geometry then however necessitates, in turn, a required adaptation of the individual angles of the horn structure (e.g., at a given aperture). That is to say, the horn geometry or the horn antenna must in each case be completely reconstructed in this case and must be adapted to the dimensions of the waveguide, which is costly and time consuming.

The invention is also based on the concept of a method which facilitates the increase in the effective range and power of HPEM systems by "serial," phase-related operation of a plurality of antennas/antenna rods, monopoles, dipoles, DS resonators. As a result of the targeted serial, time-adapted operation and driving of the individual ones of the DS resonators, antenna rods or antenna dipoles, the superposition of the electromagnetic fields is implemented predominantly in a line along the DS resonators, antenna rods or antenna dipoles disposed in succession.

According to the invention, the basic principle of the HPEM DS directional antenna is combined with the basic principle of a horn antenna with a waveguide. A plurality (n>=2) of DS resonators, antenna rods, dipoles or feed antennas in succession are integrated serially (i.e., parallel to the central axis) in the waveguide. The opening or the interface between waveguide and horn structure can remain unchanged in this case and is independent of whether one, two or more ("N") DS resonators, antenna rods, dipoles or feed antennas are integrated in the waveguide. Basically, it is only the length of the waveguide that needs to be adapted to the number and the wavelength of the feed antennas, or the distance of the feed antennas from one another and in relation to the waveguide. The antenna feeds can be driven and operated up to their maximum power, both independently, in time-synchronous fashion or with a certain time offset in relation to an individual or a plurality of other feed antennas. In principle, a "burst mode" is also possible, in which the individual antennas are driven with relatively large time lags in relation to one another. Particularly advantageously, the serial feed antennas in the waveguide are driven in such a way that the emitted wavefronts of the individual feed antennas superpose constructively in terms of the wavefront in the direction of the serially disposed feed antennas and, especially, in the direction of the interface to the horn structure/horn opening/horn aperture/horn interface, depending on the respective distance of the individual antenna feeds from one another. By way of example, if four feed antennas, each operated at the respective maximum power, are used, it is thus possible to significantly increase the overall power of the system and attain an increase in the effective range of up to a factor of two (under ideal assumptions) in relation to the use of a single feed antenna.

In this case, a substantial advantage of the invention is that a given or available (in particular non-inventive) horn structure with a given geometry, opening angles and interface to the waveguide, which is constructed for a certain frequency response, can remain unchanged or only requires marginal adaptations for as long as the emitted frequency range should not be altered. Primarily, it is only necessary to reconstruct the waveguide or adapt the length of the waveguide to the number and configuration (distances) of the feed antennas.

According to the invention, there is a serial in-phase operation (which is phase offset in accordance with the feed antenna distances) of a plurality of DS resonators, antenna rods, dipoles, feed antennas in a waveguide or in a horn antenna. This yields a significant increase in the maximum power and the effective range of the HPEM DS overall system while maintaining the horn antenna geometry. This yields an increase in the integrability with a simultaneous increase in power.

Thus, an HPEM DS multi-feed horn antenna emerges according to the invention. According to the invention, a method and a system emerge for amplifying, focusing, aligning HPEM beams/HPEM pulses by way of a serial phase-related operation of a plurality of HPEM DS resonators/antennas/antenna rods/antenna groups/antenna feeds in a waveguide/horn antenna. This yields a space-saving integration and power increase of an HPEM horn antenna system with possible maintenance of the basic horn size/horn geometry.

The invention is suitable, inter alia, for use in HPEM systems that are stationary or on a trailer for various applications (e.g., counter UAS (unmanned aerial system) as vehicle protection, C-UAS camp protection, etc.). It is also suitable for HPEM systems integrated in mobile fashion for land application on a vehicle for self-protection within the scope of close range and very close range protection and MGCS (main ground combat system) for various applications (e.g., counter UAS, C-IED (counter improvised explosive devices), convoy protection, etc.). It is also suitable for HPEM systems integrated in mobile fashion for air and sea applications on an aircraft, drone or ship for self-protection within the scope of close range and very close range protection for various applications (e.g., counter UAS, C-IED, stopping boats, etc.).

Other features which are considered as characteristic for the invention are set forth in the appended claims.

Although the invention is illustrated and described herein as embodied in a horn antenna and a method for reconstructing a horn antenna, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
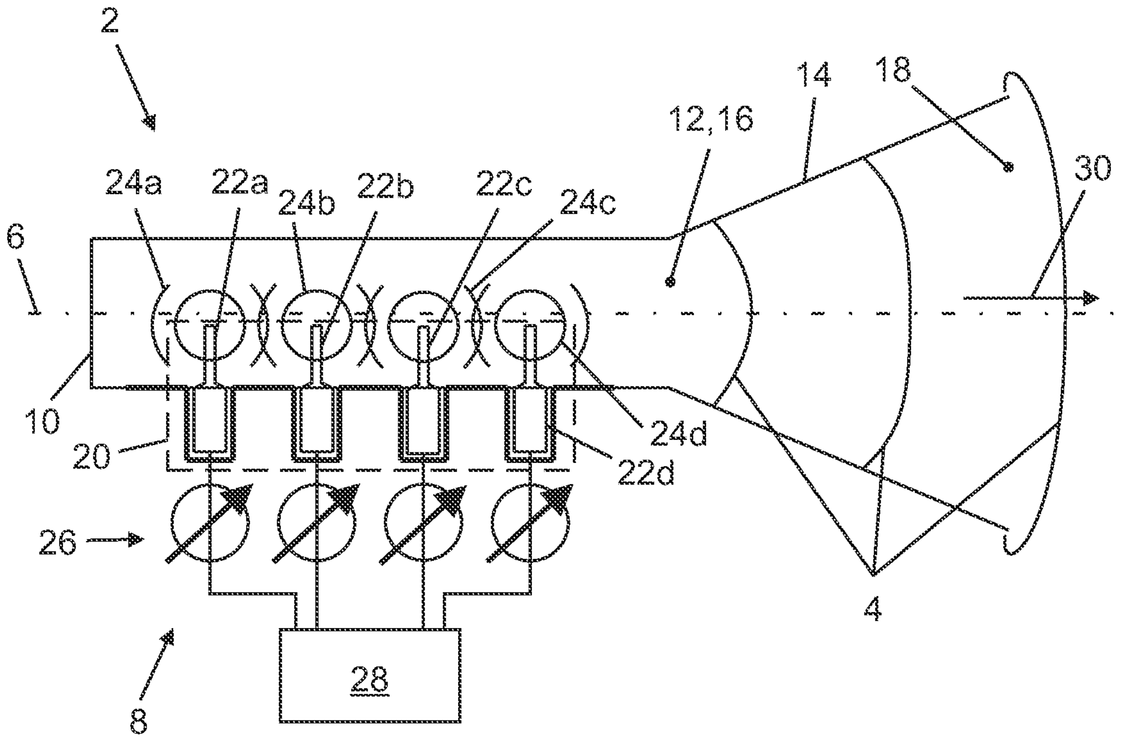
FIG. 1 is a diagrammatic, longitudinal-sectional view of a horn antenna according to the invention.

Referring now to the figures of the drawings in detail and first, particularly, to FIG. 1 thereof, there is seen a horn antenna 2 during operation, specifically when emitting an electromagnetic HPEM microwave pulse 4. FIG. 1 illustrates superpositions of wavefronts of the pulse 4. The horn antenna 2 has a central axis 6, along which the pulse 4 is emitted. The horn antenna 2 contains a microwave generator 8 for generating the pulse 4. The generator 8 contains a waveguide 10. The waveguide 10 has a generator opening 12 for emitting the pulse 4. In this case, the waveguide 10 is a cuboid metallic body which has a rectangular cross section in relation to the central axis 6 (see FIG. 4) and extends along the central axis 6.

The horn antenna 2 additionally contains a horn structure 14 which serves to shape the pulse 4. The horn structure 14 has an input opening 16 which coincides with the generator opening 12, and an output opening 18 which serves to emit the shaped pulse 4.

In the illustrated example, the generator 8 contains a single HPEM source 20 (surrounded by dashes in the figure) for generating the pulse 4. The HPEM source 20 contains four antennas 22*a-d*, which are DS resonators in this case, and are disposed in succession and parallel to the central axis 6. Each of the antennas 22*a-d* serves to respectively emit a pulse component 24*a-d*. The pulse 4 at a given time is formed as the sum of the pulse components 24*a-d* generated at that time.

The antennas 22*a-d* are fed, in a manner which is not explained in any more detail, by pulse sources 26 of the generator 8. The pulse sources are driven by a control unit 28 of the generator 8. All four antennas 22*a-d* are disposed in a common plane.

In the example, the control unit 28 drives all four antennas 22*a-d* with respect to the activation and the phase angle of their respective pulse component 24*a-d* in such a way that the pulse components 24*a-d* of these antennas 22*a-d* superpose to form the pulse 4 so that its emission direction 30 is directed parallel to the central axis 6 toward the generator opening 12 or through and out from the latter. To this end, the antennas 22*a-d* are driven "in phase" or in phase-related fashion with a suitable time offset in relation to one another. Moreover, the driving is implemented in such a way that the wavefronts of the pulse components 24*a-d* superpose constructively in the wavefront of the pulse 4, in the direction of the central axis 6 toward the emission opening 18.

Figure 2:
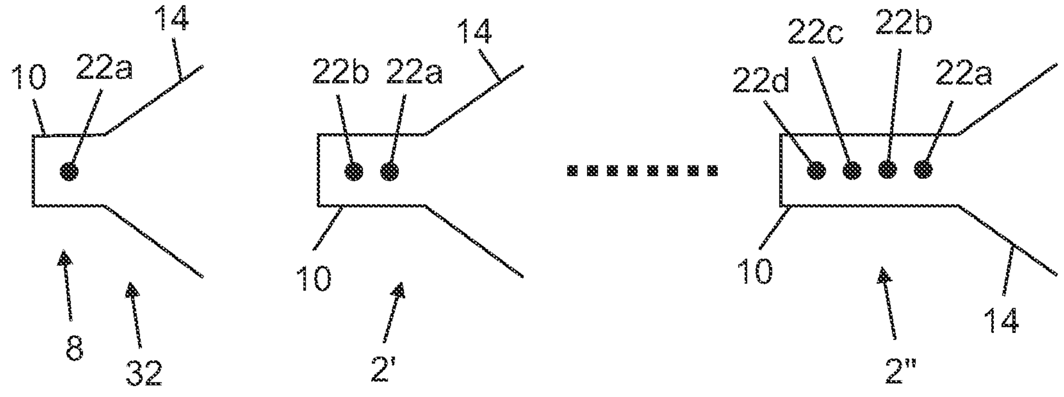
FIG. 2 is a fragmentary, longitudinal-sectional view showing a reconstruction of an existing horn antenna to form horn antennas according to the invention.

FIG. 2 shows a method for reconstructing or newly constructing an existing non-inventive horn antenna 32 to form horn antennas 2' or 2" according to the invention. The original horn antenna 32 has only a single antenna 22*a*. Otherwise the horn antenna 32 includes a generator 8 with a connected horn structure 14.

For reconstruction purposes, the number of antennas 22 is increased to two (22*a*, 22*b*) in the case of the horn antenna 2' and to four (22*a*-22*d*) in the case of the horn antenna 2". The one or three additional antennas are disposed in a row with respect to the first antenna 22*a*, the length of the waveguide 10 is increased but the remaining dimensions of the horn antenna 32 are maintained unchanged. The dashed line in FIG. 2 indicates that any other number of antennas greater than one can also be realized.

Figure 3:
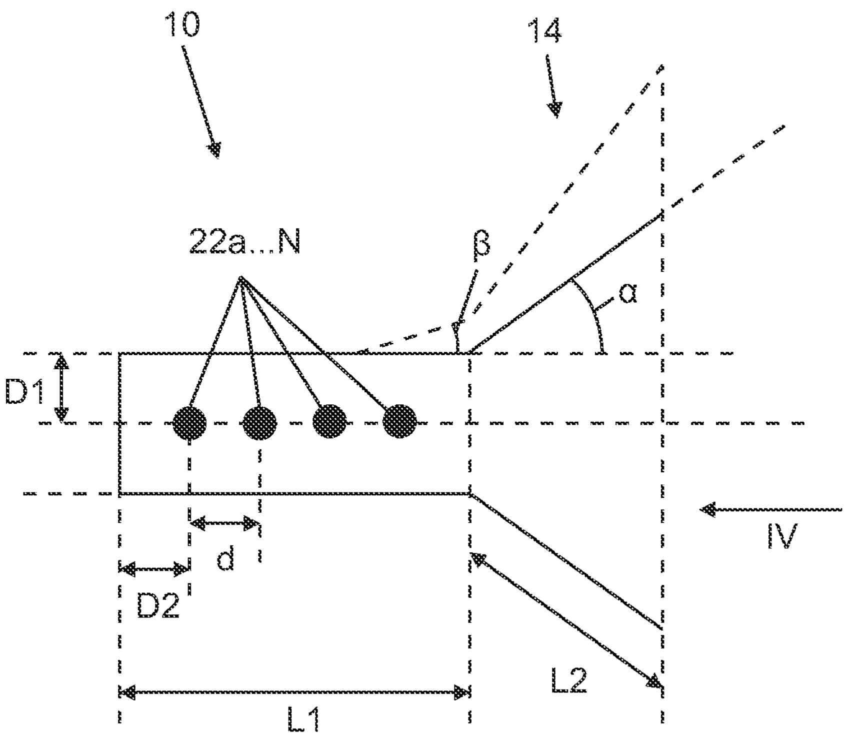
FIG. 3 is a fragmentary, longitudinal-sectional view showing geometric relationships and options for varying them on a horn antenna according to the invention.

FIG. 3 symbolically shows options for varying the horn structure 14 and/or the waveguide 10 in a horn antenna 2 according to the invention, which can be undertaken empirically or in accordance with simulations or trials in order to optimize the emission of pulses 4. Without going into any detail in this respect, it is possible, inter alia, to vary a number N (four in this case) of the antennas 22, an opening angle α and/or a length L2 of the horn structure 14, an (also sectional) opening angle β and/or a length L1 of the waveguide 10, distances d between the antennas 22 and wall spacings D1, D2 of the antennas 22 from the walls of the waveguide 10. In the present example, the distances d between two adjacent antennas 22 in each case are chosen to be the same.

Figure 4:
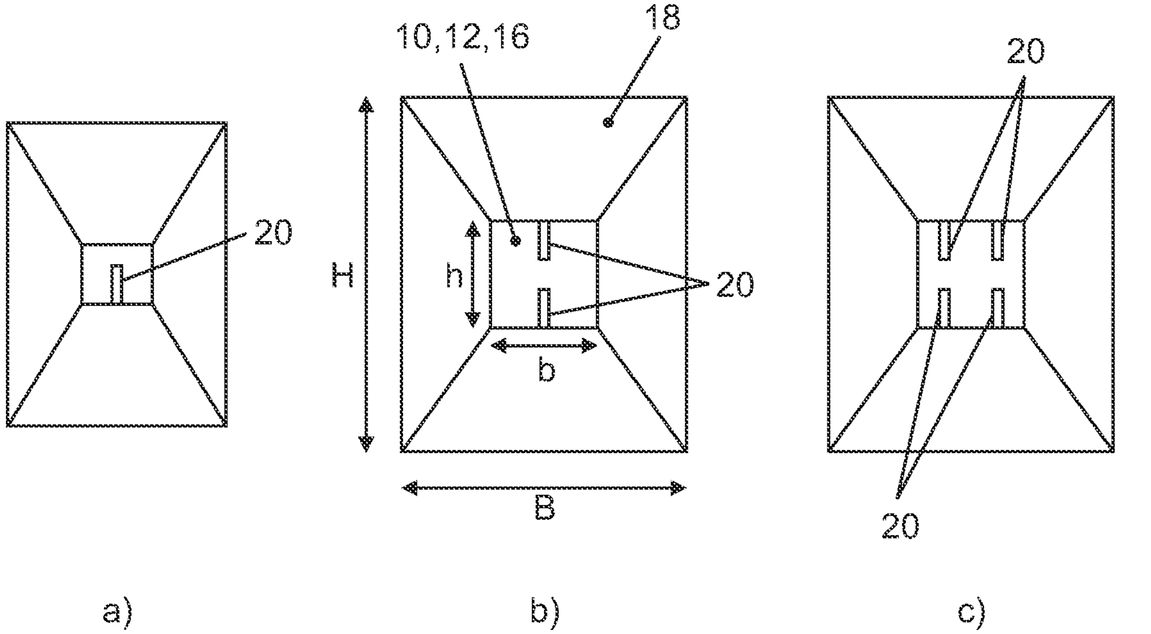
FIG. 4 is a group of elevational views showing a horn antenna according to the invention with a) one, b) two and c) four HPEM sources.

FIG. 4*b* illustrates further options for variation in the form of the height H and width B of the "horn" or of the emission opening 18, and the height h and width b of the waveguide 10 or of the generator opening 12 and the input opening 16. In this case, FIG. 4 shows frontal views overall of different horn antennas 2 (in the direction of an arrow IV in FIG. 3). In this case, FIG. 4A shows the situation of FIGS. 1-3, specifically with a single HPEM source 20. FIG. 4B shows, in one variant, two respective sources 20 (disposed above one another) of four antennas. FIG. 4C shows a variant of four sources 20 (a respective two next to one another and a respective two above one another) of four antennas.

The following is a summary list of reference numerals and the corresponding structure used in the above description of the invention:

LIST OF REFERENCE SIGNS

2 Horn antenna
4 HPEM microwave pulse
6 Central axis
8 Microwave generator
10 Waveguide
12 Generator opening
14 Horn structure
16 Input opening
18 Emission opening
20 HPEM source
22*a-d* Antenna
24*a-d* Pulse component
26 Pulse sources
28 Control unit
30 Emission direction
32 Horn antenna (non-inventive)
α,β Opening angle
H Height (horn)
B Width (horn)
h Height (waveguide)
b Width (waveguide)
L1 Length (waveguide)
L2 Length (horn structure)
d Distance (antennas)
D1,2 Wall spacing

The invention claimed is:

1. A horn antenna for emitting a high-power electromagnetic microwave pulse along a central axis, the horn antenna comprising:

a microwave generator for generating the pulse, said microwave generator having a waveguide with a generator opening for outputting the pulse, said waveguide having a constant polygonal cross section extending entirely along said waveguide along the central axis; and a horn structure for shaping the pulse, said horn structure having an input opening serving to radiate the pulse, said input opening being connected to said generator opening, and said horn structure having an emission opening for emitting the shaped pulse;

said microwave generator containing at least one high-power electromagnetic source for generating the pulse;

said at least one high-power electromagnetic source containing at least two antennas disposed in succession in parallel with the central axis, said at least two antennas each serving to emit a respective pulse component; and the pulse being formed as a sum of said pulse components.

2. The horn antenna according to claim 1, wherein at least one of said at least two antennas is at least one of an antenna rod or an antenna damped sinusoidal resonator or a feed or a dipole or an antenna group.

3. The horn antenna according to claim 1, wherein said waveguide is a metallic body.

4. The horn antenna according to claim 1, wherein said waveguide is a body made of an electrically conductive material.

5. The horn antenna according to claim 1, wherein said waveguide has a cuboid shape.

6. The horn antenna according to claim 1, wherein at least one of said horn structure or said waveguide has a polygonal cross section relative to the central axis.

7. The horn antenna according to claim 1, wherein said at least two antennas are disposed together in one plane.

8. The horn antenna according to claim 1, wherein said at least two antennas include adjacent antennas of said at least one high-power electromagnetic source being spaced apart from one another by identical spacings in at least one high-power electromagnetic source.

9. The horn antenna according to claim 1, wherein said at least two antennas include adjacent antennas of said at least one high-power electromagnetic source being spaced apart from one another by different spacings in at least one high-power electromagnetic source.

10. The horn antenna according to claim 1, which further comprises a controller configured:

to drive an individual antenna of said at least two antennas to generate the pulse, or to drive an activation and a phase angle of respective pulse components of said at least two antennas, causing said pulse components of said at least two antennas to superpose and form the pulse along an emission direction directed parallel to the central axis toward said generator opening.

11. The horn antenna according to claim 10, wherein said controller is configured to drive said at least two antennas individually or in a time-synchronous manner or with a time offset relative to an individual or a plurality of other antennas.

12. The horn antenna according to claim 10, wherein said controller is configured to drive individual antennas of said at least two antennas in a burst mode with time lags.

13. The horn antenna according to claim 10, wherein said controller is configured to drive said at least two antennas to cause wavefronts of said pulse components to superpose constructively in a wavefront of the pulse, in a direction of the central axis toward said emission opening.

14. A method for reconstructing a horn antenna to form a horn antenna according to claim 1 with increased power, the method comprising:

proceeding from at least one respective first antenna:

constructively increasing a number of antennas of a respective high-power electromagnetic source and orienting remaining antennas of the respective high-power electromagnetic source in a row relative to the at least one first antenna;

increasing a length of the waveguide; and leaving other dimensions of the horn antenna unchanged.

15. The horn antenna according to claim 1, wherein said at least two antennas are disposed exclusively in said waveguide.

* * * * *